United States Patent Office 2,799,844
Patented July 16, 1957

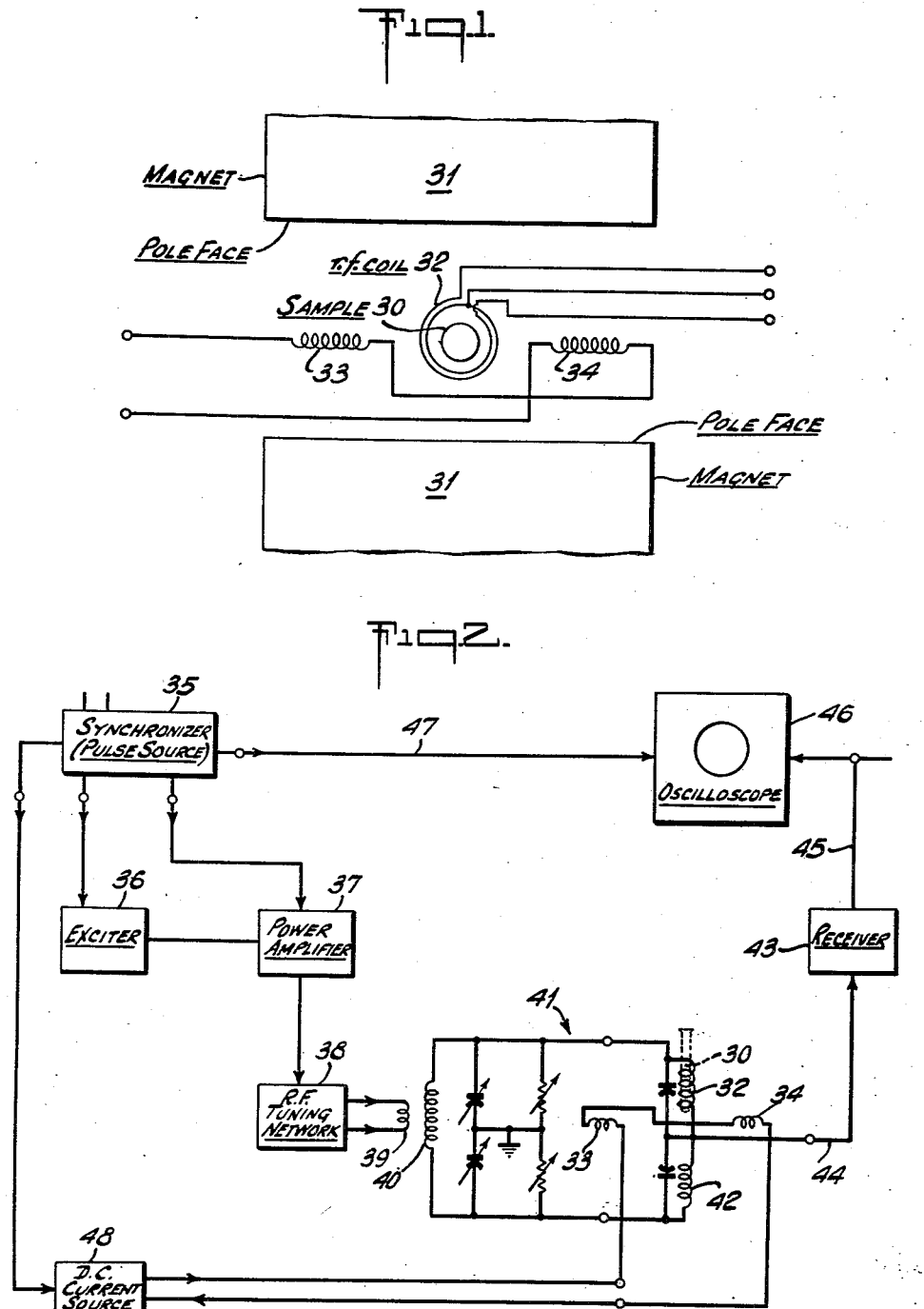

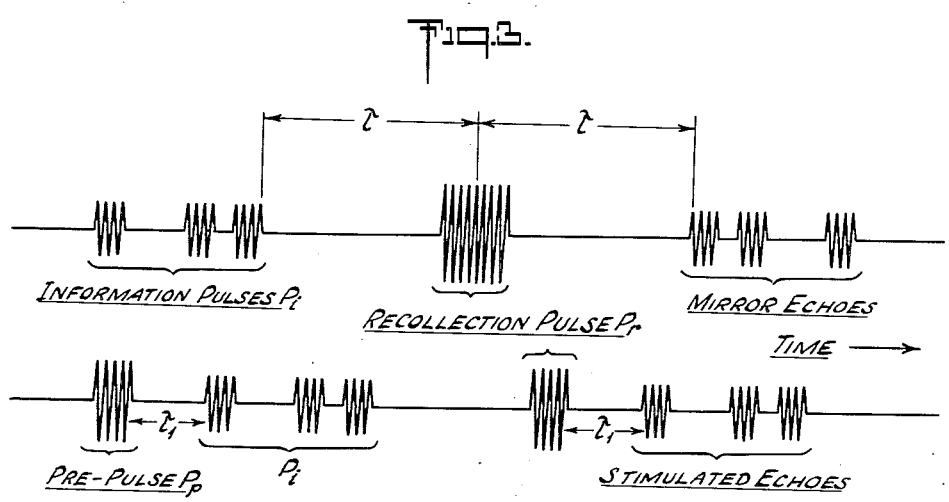
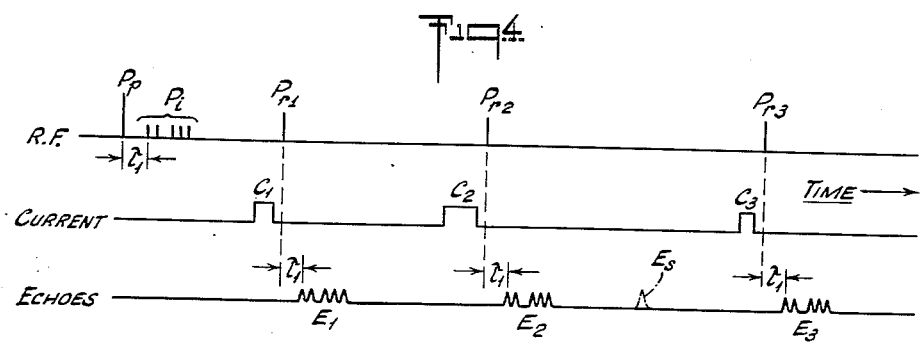
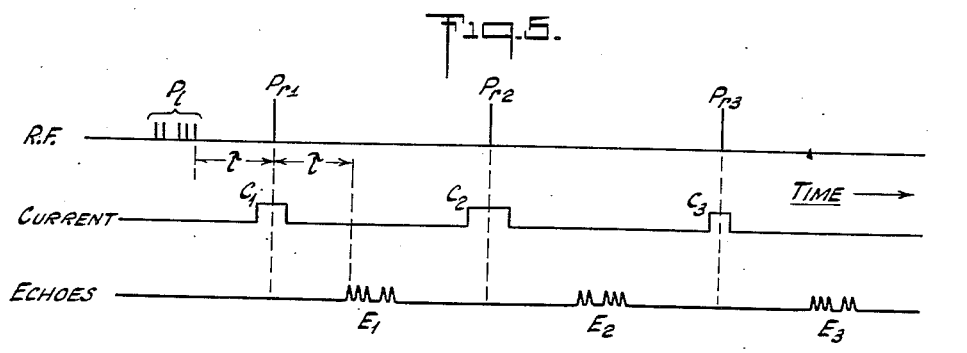

2,799,844

SPIN ECHO MEMORY PROCESSES

Arthur G. Anderson, Riverdale, and John W. Horton, New York, N. Y., assignors to International Business Machines Corporation, a corporation of New York Application March 8, 1955, Serial No. 492,894

6 Claims. (Cl. 340—173)

The present invention pertains to improvements in spin echo memory processes, being directed to multiple read-out of information placed in spin echo storage.

An object of the invention is to provide a method by which computational or similar informational data, stored in a sample of chemical substance, may be reproduced repeatedly without the necessity of re-entering the original data.

A further object is to provide a method of the above nature in which the timing and relative spacing of the repeated read-outs may be varied at will.

Another object is to provide a process of the above type in which destructive inter-action among the entering and read-out control pulses is prevented.

Spin echo technique in general comprises a method of storing information in the form of electrical pulses applied to samples of suitable chemical materials, and subsequently recovering the information as "echo" pulses produced by free nuclear induction.

The phenomenon of free nuclear induction per se has been set forth in Patent No. 2,561,489 to F. Bloch et al., as well as in various well-known scientific publications by Bloch and by Purcell. The extension of the effect to produce spin echoes, the work of E. L. Hahn, was described by the latter scientist in an article entitled "Spin Echoes," Physical Review, Nov. 15, 1950. Since the above publications are readily available in the public domain, repetition herein of the entire complex mathematical analysis contained in them is unnecessary. However, in order to set forth most clearly the nature and advantages of the present invention, it is appropriate first to describe briefly the pertinent general principles of spin-echo technique. In this explanation, and the succeeding exposition of the present invention, reference is made to the accompanying drawings, in which:

Figures 1 and 2 are diagrams jointly illustrating typical spin-echo apparatus suitable for carrying out the method;

Figure 3 is a double time-sequence graph illustrating the basic difference between mirror type and stimulated type spin echoes.

Figure 4 is a linear diagram illustrating the sequence of effects in a stimulated echo system as operated in the present invention, and Figure 5 is a similar diagram illustrating multiple recall in a mirror echo system.

Nuclear induction, while in itself a magnetic function, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin at a characteristic frequency about its own central axis, and as the nucleus has mass, it possesses angular momentum of spin and accordingly comprises a gyroscope, infinitesimal, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all nuclei concerned.

So long as the sample remains undisturbed in the field, the gyroscopic nuclei remain in parallel alignment therewith as noted. If however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0 = \gamma H_0$, where $H_0$ is the field strength affecting each nucleus and $\gamma$ is the previously noted gyromagnetic ratio. This precessional frequency $\omega_0$ is termed the Larmor frequency, and since for any given type of nuclei $\gamma$ is a constant (for example $2.68 \times 10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies.

It is upon the above described characteristic of differential precession in an inhomogeneous field that the technique of spin echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electro-magnetic equivalent. The main magnetic field $H_0$ exists in the vertical direction, while a radio-frequency coil 32 is arranged to supply a field with its axis into or out of the paper of the diagram, the R. F. field thus being perpendicular to the $H_0$ field. A pair of direct current coils 33 and 34, arranged as shown diagrammatically with respect to the magnet 31 and R. F. coil 32, may be provided to change the inhomogeneity of the field $H_0$, as hereinafter explained.

Figure 2 illustrates by semi-block diagram a typical electrical arrangement by which the impulses may be stored and echoes recovered from the sample 30. Inasmuch as the internal structures and modes of operation of the labelled block components are in general well known in the electronic art, description thereof will appropriately be limited to that necessary to explain the manner in which or with what modification they play their parts in carrying out the present invention.

A synchronizer or pulse generator 35 originates information and recollection pulses and other control pulses required by the system. The exciter unit 36, controllable by the pulse source 35 and comprising primarily an oscillator and a plurality of frequency doubling stages, serves as a driving unit for the R. F. power amplifier 37. In the production of a pulse the source 35 first energizes the exciter 36 to place an R. F. driving signal on the amplifier 37, then "keys" the amplifier to produce an output signal therefrom. This output is routed via a tuning network 38 to a coil 39 which is inductively coupled to a second coil 40 adapted to supply energy to a bridge circuit network 41. One leg of the bridge circuit comprises the previously described R. F. coil 32, Fig. 1, while a second R. F. coil 42, identical with coil 32, forms the second or balancing leg. A signal amplifier or receiver 43 has its input conductor 44 connected to the network 41 between the coils 32 and 42. The output 45 of the amplifier 43 is directed to suitable apparatus for utilization of the echo pulses, such apparatus being illustrated herein by an oscilloscope 46 provided with a horizontal sweep control connection 47 with the synchronizer 35.

The sample 30 is retained within the R. F. coil as indicated. From the balanced bridge arrangement shown, it will be evident that R. F. pulses introduced via the coil 40 energize the coils 32 and 42 equally, so that while the sample 30 receives the desired input pulses, the centrally connected conductor 44 carries but little R. F. power to the amplifier 43. By this means, the sample 30 may be subjected to heavy R. F. power pulses without unduly affecting the signal amplifier. However, echo pulses induced by the sample 30 affect only the coil 32, so that by unbalance of the bridge such pulses are applied to the amplifier 43 as desired.

A D. C. current source 48, controllable by the synchronizer 35, is adapted to supply current to the coils 33 and 34 for field inhomogeneity control as previously mentioned.

In initiating storage, the sample 30 is first subjected to the polarizing magnetic field $H_0$ for sufficient time to allow its gyromagnetic nuclei to become aligned as previously described. Taking the simplest case of a single echo production, the sample is then subjected to a pulse of an alternating magnetic field $H_1$ produced by R. F. alternating currents in the coil 32 and hence normal to the direction of the main field $H_0$. This R. F. magnetic field pulse exerts a torque on the spinning nuclei which tips them out of alignment with $H_0$, so that as the pulse terminates the nuclei begin to precess about the main field direction, conveniently termed the Z-axis, with their characteristic Larmor frequencies. Their magnetic moments or components thereof thus rotate in a plane normal to the Z-axis, which plane accordingly may be termed the XY plane. Taking for example the behavior of a related group of spinning nuclei as characteristic of all such particles in the sample, it will be evident that the inhomogeneity of the field $H_0$ in different parts of the sample gives rise to the previously explained differential Larmor precession, so that while the group as a whole continues to rotate at a mean rate $\overline{\omega}_0$, the constituent moments of the group fan out or separate from each other at rates dependent on their particular differences in Larmor frequency. So long as this spreading condition persists, the diffusion of the constituent moments of the group prevents their cooperation to generate a signal.

To initiate echo formation, the sample is subjected to a powerful torsional R. F. pulse, termed the "recollection" pulse, which in effect changes the divergence of the constituent moments to convergence. With maintenance of proper time and field condition relationship, as further noted hereinafter, the rotating moments eventually return to coincidence, at which point they reinforce each other to induce a signal in the R. F. coil 32, this signal being the "echo" of the "entry" R. F. pulse which initiated the sequence. The signal is transmitted to the amplifier 43, amplified, and directed to the oscilloscope 46 or other device for utilization.

The above description set forth for illustration the simple case of a single echo, in which case the maximum echo signal would normally be produced by applying an "entry" pulse sufficient to tip the moment group through 90°, i. e., completely into the XY plane. Lesser angles of tip also produce useful moment groupings, so that by applying successive entry pulses of proper duration and amplitude, a plurality of entries may similarly be made to produce a corresponding train of echoes. However, in this and all other variations of the process as hereinafter set forth, it will be understood that the basis of echo production is the same, namely the systematic disassembly and subsequent systematic reassembly of related moments of spinning particles in a suitable field.

In practice, there are two important types of procedure in spin-echo formation, namely the "mirror echo" process and the "stimulated echo" process, illustrated in comparison in Figure 3. In this figure the ordinate represents the voltage across the terminals of the R. F. coil 32 containing the sample, while the abscissa represents time. In order to make illustration feasible, the echo pulses have been drawn $10^5$ times larger than they would be on a scale of the ordinate suitable for drawing the storage and recollection pulses. The duration of each storage pulse may be of the order of a few microseconds, whereas the times $\tau$, which are the "memory" or "storage" intervals, may be for example of the order of seconds when water is used as a storage medium comprising the sample 30.

The difference in storage methods for "mirror" and "stimulated" echo production, which is a fundamental distinction, has been set forth in detail in the previously mentioned scientific publication and therefore need be reviewed only in pertinent relation to the present invention. In mirror storage, as illustrated, the entry pulses, applied to the nuclei as previously explained, precede the recollection pulse in their chosen order, while the echoes follow the recollection pulse in reverse order. Thus it will be seen that the echo and storage pulses have "mirror" symmetry with respect to the center of the recollection pulse, hence the characteristic name for this type of echo procedure.

In the case of the stimulated echo process, as shown in the diagram, an R. F. "pre-pulse" $P_p$ is first applied to the sample. This pre-pulse, in the simplest case shown for purposes of explanation, is of sufficient amplitude and duration to tip all the nuclear moments of the sample substantially through 90 degrees, i. e., into the XY plane, where during a time interval $\tau_1$ they are permitted to spread and distribute themselves throughout the plane by differential Larmor precession as previously explained. Following the time interval $\tau_1$, the storage pulses are applied, these pulses having the effect of depositing groups or "families" of moment vectors on a system of cones revolving about the Z-axis or direction of the field $H_0$, i. e., the pulses may be described as entered into "Z-axis storage."

The recollection pulse $P_r$ is of proper duration and amplitude to tip the revolving moment cones again into the XY plane, at the same time having the effect of reversing the relative angular motions among the constituents of each moment group. Thereupon the constituents of the respective groups re-assemble to induce echo pulses in the coil 32, these pulses starting at the end of a second time period after the recollection pulse and appearing in the same order as their corresponding entry pulses. Thus the figure for the stimulated echo process will be seen to have "translational" symmetry in the relation of the entry pulses to the pre-pulse and the echoes to the recollection pulse.

The foregoing general description of information storage and subsequent extraction in the form of echo pulses has dealt with a single read-out from any given entry combination, the single recollection pulse for such read-out being sufficient to tip the precessing nuclei or particles for example through approximately 90° in the case of a stimulated system. On the other hand, when this type of memory process is to be employed in computational systems wherein the same information combination may enter repeatedly into the computation, it is advantageous to be able to produce such repeated read-outs from a single storage entry. Since many computations, for example those employing binary numbers, require reproduction of information pulse combinations in the same order as in their entry, and as the stimulated echo process has this inherent characteristic in addition to that of flexibility in timing of the read-out from Z-axis storage, the stimulated process is obviously indicated for such services. However, once a system of moments has been completely removed from Z-axis storage it can only be replaced therein by a repeated entry process. It therefore follows that for multiple recall from a single entry the reproduction process must be such as not to exhaust the store until it has furnished all the desired read-outs.

The method of the present invention carries out the above requirement by employing a phenomenon which may be termed partial read-out. In the previous explanation of multiple information impulse entry it was noted that entry angles of less than 90° produce useful echo effects, this fact being the basis of multiple pulse information coding and reproduction. In a similar manner, recollection pulses of less than 90° may be used to extract components of information from Z-axis storage, while leaving a useful remainder therein. These pulses may properly be termed partial recollection pulses, being in general representative of fractions of the pre-pulse dependent in extent on the number of extractions to be provided. While the actual inter-action among the moment vectors is highly complex, the net effect may be visualized as a tipping of the previously mentioned precessional moment cones only partially away from the Z-axis, so that only components of their constituent moments reach the XY plane to form echoes, i. e., to provide a partial read-out. It should be noted, however, that since all cones in the Z-axis storage are affected, the read-out is partial only in amplitude of the resultant echoes, the number and arrangement of the echoes corresponding in each case to those of the original information pulses. Application of additional partial recollection pulses to the remaining Z-axis store similarly produces additional read-outs, the amplitude of the echoes produced varying approximately as $$\sqrt{\frac{1}{N}}$$

where N is the number of read-outs for which it is desired to provide.

Figure 4 illustrates a typical application of the method. Referring to this figure, it will be seen that a "word" or combination of R. F. information pulses $P_i$ is entered in the sample following the previously explained prepulse $P_p$ by the time interval $\tau_1$. Prior to the first partial recollection pulse $P_{r1}$, a direct current pulse $C_1$ is directed through the coils 33 and 34, Figs. 1 and 2, thereby generating a local bucking magnetic field which momentarily changes the relative local values of the field inhomogeneity $\Delta H_0$.

When it is desired to effect a read-out, the first R. F. partial recollection pulse $P_{r1}$ is applied via the coil 32, thus effecting a partial transfer of the stored moment combinations $P_i$ from Z-axis storage to the XY plane as previously noted. Thereafter, at the termination of a period $\tau_1$ a first reproduction of the information pulse train appears as echo train $E_1$. Similarly, after application of a second current pulse $C_2$, a second partial recollection pulse $P_{r2}$ effects a second partial withdrawal of information from the remaining Z-axis storage to produce the second echo train $E_2$; again following a third current pulse $C_3$ the third partial recollection pulse $P_{r3}$ may be applied to produce a third read-out $E_3$, etc. It will be noted that the time periods from $P_p$ to $P_{r1}$, from $P_{r1}$ to $P_{r2}$, and from $P_{r2}$ to $P_{r3}$ are shown as of differing extents. This illustrates one of the practical advantages of the present use of stimulated echoes in multiple recall, namely, that each desired read-out can be made at any convenient time point as called for by the particular computing or related service in which the system is employed, the only limitations in this respect being that recalls must not overlap and that all read-outs must be completed within the memory period of the particular chemical sample used for storage.

In the present invention the current pulses $C_1$, etc., which will be observed to be of differing duration and amplitude characteristics, perform a dual function. Their first function is to act as discriminator pulses to eliminate any unwanted mirror-echo effects, in the manner set forth in copending application Serial Number 443,216, filed July 14, 1954, now Patent Number 2,714,714. For clarity in the earlier explanation herein of the fundamental differences between mirror and stimulated echo phenomena these processes were necessarily described in their pure states, that is as though each occurred without any presence of the other. In the complicated moment interrelationships existing in practice, however, operation of a stimulated echo system may, if not deliberately prevented, be accompanied by secondary mirror echo effects, and vice versa. In the present case, mirror echo effects are eliminated by denying a circumstance necessary to their formation, namely, the presence of mirror symmetry in time and in field condition about the recollection pulse. Thus for example, the current pulse $C_1$ introduces a change in the magnetic field condition immediately before the partial recollection pulse $P_{r1}$, but no balancing field pulse appears immediately following the latter. Accordingly, no mirror symmetry in the field condition can exist about $P_{r1}$, and no significant mirror echoes can form. Similarly, the current pulses $C_2$ and $C_3$ prevent mirror effects about $P_{r2}$ and $P_{r3}$, respectively. As Z-axis storage is substantially impervious to field variations, the current pulses occurring before the respective partial recollection pulses have no significant effect on the original or residual information grouping existing in such storage, so that the repeated read-out trains of stimulated echoes are produced without interference.

In addition to the above, the second function performed by the current pulses in the present method is to prevent the possibility of spurious stimulated echo formation arising out of inter-action among the pre-pulse and partial recollection pulses themselves. Without such provision, for example, following the pre-pulse $P_p$ the pulse $P_{r1}$ may act as an information pulse to effect a false entry in Z-axis storage, which entry may be subsequently read out by pulse $P_{r2}$ as a spurious stimulated echo $E_5$ as illustrated in dot and dash lines, Fig. 4. However, as previously mentioned, the current pulses $C_1$, $C_2$ and $C_3$ are characteristically different and thus produce characteristically differing variations in the field inhomogeneity $\Delta H_0$. A requisite for effective production of a stimulated echo is translational symmetry in integrated time and field condition between the pre-pulse and entry pulse sequence and the recollection pulse and echo sequence. The absence of a current pulse equivalent to $C_1$ just prior to the time when $E_5$ would normally appear prevents the accomplishment of the above-mentioned translational symmetry, so that the spurious echo $E_5$ is unable to form. In the same manner, the characteristically differing current pulses prevent spurious echo formation among any other combinations of the pre-pulse and/or the partial recollection pulses. The current pulses are illustrated as differing in duration-amplitude area, but it will be understood that their characteristic differences may be accomplished by other means such as the differing spatial arrangements set forth in co-pending application Serial No. 478,596, filed Dec. 30, 1954, now Patent Number 2,757,359.

Fig. 5 illustrates the production of multiple read-outs by mirror echoes. In this process, after entry of the information pulses and the subsequent divergence of the related moments in the XY plane, the 180° recollection pulse in effect reverses the relative precessional directions of the moments, as previously described respecting Fig. 3, so that they re-converge to generate echo pulses. Having converged, the moment vectors cross and re-diverge. If a second read-out is desired, a second 180° recollection pulse is applied, again reversing the relative directions and resulting in convergence to form an echo train which is the mirror image of the first. Similarly, further 180° recollections pulses produce further mirror echo read-outs. Discriminator pulses $C_1$, $C_2$ and $C_3$, each disposed in mirror symmetry about its particular recollection pulse, may be provided to eliminate secondary stimulated echo effects.

While the mirror type of multiple read-out may be applied to some types of service, it will be evident that certain inherent characteristics render it generally inferior to the stimulated echo multiple recall method described above. A principal limitation of the mirror method lies in the relative rigidity of its timing. Thus, if after an entry a considerable time elapses before a recall is required, application of the recollection pulse must be followed by a similarly long time interval before the desired echoes can appear. The same limitation exists for later read-outs. At the same time, the necessity for mirror symmetry within each current pulse $C_1$, etc., and in its accurate relation to a centrally located recollection pulse may present considerable practical difficulty. Finally, the mirror type of operation causes the read-out pulse groups to appear alternately in reversed and original orders, as shown in Fig. 5. The disadvantages of this characteristic in various computational services, for example those employing binary number systems, as previously mentioned will be obvious.

On the other hand, the partial read-out stimulated echo method of the present invention avoids the above limitations. The only internally fixed time factor existent therein is the duration of the interval $\tau_1$, and the latter may be made arbitrarily so small that the delay between recollection pulse and echo response is effectively negligible. No particular symmetry of any type is normally necessary either internally or in exact locations of the current pulses $C_1$, etc. Furthermore, in each echo train the pulses appear in the same order as those of the original information pulses, the information outputs thus being produced throughout in generally most useful form.

The process has been illustrated and described as applied to multiple read-outs of a single information train entered following a pre-pulse $P_p$ of approximately 90°. However, it may similarly be applied in the case of multiple information train entry systems such as that set forth in the previously mentioned co-pending application Serial No. 478,596, wherein differing information trains are entered in the same storage medium following individual pre-pulses of less than 90°. In either case the repetitive extraction process is the same, utilizing partial recollection pulses adapted to produce tipping angles which are fractions of the related pre-pulse angles, the magnitudes being dependent on the number of repetitions to be provided. Thus while the invention has been set forth in preferred form, it is not limited to the precise procedures illustrated, as various modifications may be made without departing from the scope of the appended claims.

We claim:

1. In a spin echo system of information storage and recovery by controlled differential precession of gyromagnetic particles of a substance in an inhomogeneous polarizing field, that method of effecting singular storage of information and multiple recovery thereof which includes the steps of applying a torsional radio-frequency pre-pulse of pre-determined angular displacing value to said particles to condition the same for receiving Z-axis storage, applying a train of torsional radio-frequency information pulses to said particles to establish said information pulses in Z-axis storage, applying a plurality of torsional radio-frequency partial recollection pulses of less than said predetermined angular value to said particles, whereby each of said partial recollection pulses may extract components of all said information pulses from said Z-axis storage to form an individual train of echo signals correspondent to said information pulse train, and detecting said trains of echo pulses.

2. A method according to claim 1 including the step of applying a pulse of inhomogeneity change to said field prior to each of said partial recollection pulses.

3. A method according to claim 1 which includes the step of applying characteristically differing pulses of inhomogeneity change to said field prior to said respective partial recollection pulses.

4. In a spin echo system of information storage and recovery by controlled differential precession of gyromagnetic particles of a substance in an inhomogeneous polarizing field, that method of effecting singular storage of information and multiple recovery thereof which includes the steps of establishing a pre-determined combination of information pulses in Z-axis storage among said particles, applying a plurality of torsional radio-frequency partial recollection pulses of less than 90 degrees angular value to said particles for repeatedly extracting components of all said information pulses from said Z-axis storage to form successive echo signal combinations each representative of said established information combination, and detecting said successive echo signal combinations.

5. A method according to claim 4 which includes the steps of applying a pulse of inhomogeneity change to said field prior to each of said repeated extractions.

6. A method according to claim 4 which includes the step of applying characteristically differing pulses of inhomogeneity change to said field in pre-determined time relation to each of said respective repeated extractions.

References Cited in the file of this patent

UNITED STATES PATENTS

| | | |
|---|---|---|
| 2,714,714 | Anderson | Aug. 2, 1955 |
| 2,718,629 | Anderson | Sept. 20, 1955 |